Patented June 27, 1944

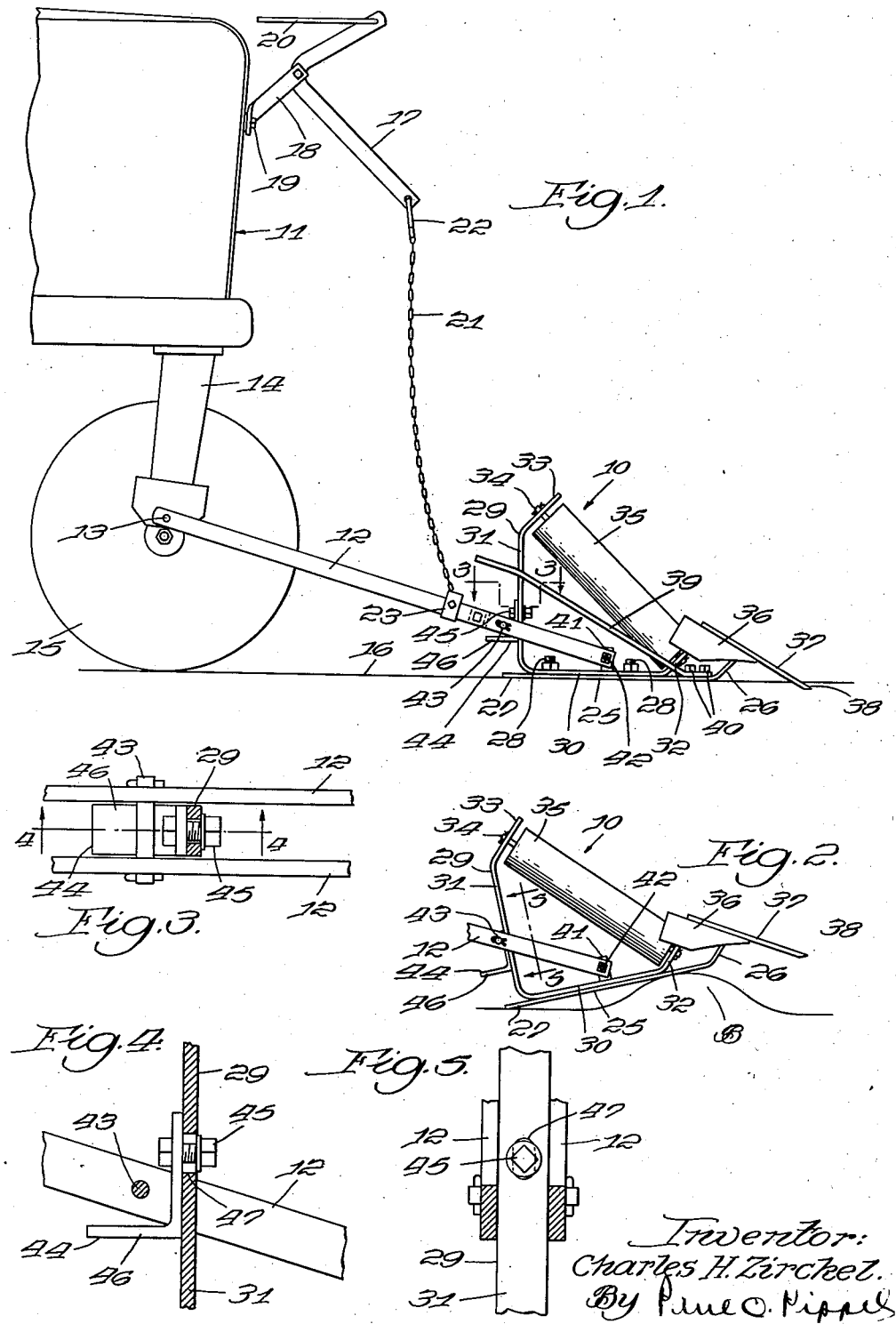

2,352,506

UNITED STATES PATENT OFFICE 2,352,506

VINE LIFTER AND DIVIDER

Charles H. Zirckel, Chicago, Ill., assignor to International Harvester Company, a corporation of New Jersey Application August 10, 1942, Serial No. 454,205

3 Claims. (Cl. 97—192)

This invention has to do with apparatus for treating a crop growth spread upon the surface of a field and relates more particularly to an improved apparatus for lifting such crop growth from the field surface and for rearranging the same.

The general object of the present invention is the provision of a novel crop lifting and separating structure wherein means for penetrating and lifting the crop is supported upon a shoe that skids over the earth's surface, and wherein this shoe is pivotally connected with a pilot means, from which it receives driving force, to enable the shoe to vary its position according to the slope or contour of the encountered surface.

Another object is the provision of a crop lifting and separating structure according to the preceding object and wherein stop means are provided to prevent the leading end of the shoe dipping to such an extent that furrowing parts thereon would furrow into the ground to an undesired and uncontrolled depth.

Still another object is the provision of a reliably operable apparatus of the instant character in a form that is simple, rugged, and inexpensively produced.

These and other desirable objects inherent in and encompassed by the invention will be better understood from the following description together with the annexed drawing, wherein:

Figure 1 is a side elevational view of an apparatus embodying the invention, together with a tractor portion with which it is operably connected;

Figure 2 is a side elevational view of a part of the apparatus shown in a position that it is adapted to occupy upon encountering a bank or the like upon the surface of a field being traversed;

Figure 3 is a fragmentary view partly in section taken upon the line 3—3 of Figure 1;

Figure 4 is a fragmentary vertical sectional view taken upon the line 4—4 of Figure 3;

Figure 5 is a fragmentary sectional view taken upon the line 5—5 of Figure 2.

Referring now to the drawing, the invention is illustrated in connection with a vine lifter and divider assembly 10 which is especially suited for the lifting and dividing or separation of the vines emanating from bean plants which are in rows. One or more of the apparatus 10 is connected as to the front end of a tractor 11 and in such relation thereto that each of the apparatus 10 is advanced across the field between adjacent rows of the plants. The vines, which spread out from the plant rows along the ground, become mixed and intertangle with the vines of adjacent rows within the spaces between the rows, and it is the purpose of the apparatus to pass beneath the intertangled plant growth between the plant rows and to lift such growth and penetrate and separate the same, whereby the vines of each row are separated from those of the adjacent row and are thus rearranged and conditioned for facilitating their being harvested by other succeeding apparatus not shown.

The apparatus or assembly shown in the drawing comprises and is supported upon the front ends of laterally spaced pilot bars 12. The back ends of these bars are pivotally connected at 13 to lower end portions of a fork 14 for a guide wheel 15 of the tractor. These bars 12 may be pivoted counter-clockwise about their pivotal supports 13 for lifting the apparatus from the earth's surface 16 by the manipulation of a bell crank 17 which is pivotally supported upon a bracket 18 attached to the tractor by a bolt 19. When the bell crank 17 is pivoted counter-clockwise by the application of a backward force to a control rod 20 which is attached to the upper leg of the bell crank, the lower leg of such bell crank will be caused to lift upwardly upon a lifter chain 21 which is connected to said lower leg of the bell crank by a hook 22 and to portions of the pilot bars 12 by a strap 23 suitably bolted thereto. Obviously, the lifting of the hook 22 by the counter-clockwise rotation of the bell crank will cause the chain to lift the forward portions of the pilot bars 12 to lift the apparatus from the ground incident to pivoting of said bars about their pivotal connections 13.

When the apparatus is in use, the parts will occupy some such position as illustrated in Figure 1, wherein it will be noted that the lift chain 21 is slack so as not to interfere with the apparatus remaining in contact with the earth's surface though that surface is of rolling or uneven contour. Lifting force is supplied to the control rod 20 for elevating the apparatus only for the purposes of transporting or when turning the apparatus about as at the end of a field.

The working part of the apparatus comprises and is carried upon a skid shoe 25 having an upturned leading portion 26 and a trailing portion 27. Bolts 28 are employed for connecting a roller support bracket 29 onto the upper surface of the said shoe. This bracket 29 includes a straight base portion 30 which rests flatly upon the upper face of the shoe 25, and upright portion 31, and opposed angular end portions 32 and 33 between which there extends a roller pin 34 on which there is journaled a divider roller 35.

The leading end of the shoe 25 has suitably attached thereto a roller guard member 36 together with a divider point member 37 of which the pointed end 38 normally operates a short distance beneath the earth's surface. A pair of vine-turning rods 39, one of which is shown in Figure 1, are arranged symmetrically upon the shoe 25, each being connected to a forward portion thereof by bolts 40.

A pivotal connection is had between the shoe 25 and the forward ends of the pilot bars 12 by means of a bracket 41 which is welded or otherwise connected with the upper side of the said shoe and a bolt 42 which passes through an aperture in said bracket and apertures within the lower ends of said bars 12. It will be noted that the bracket 41 is connected with the shoe 25 at a point substantially midway between its leading and trailing end portions, although it has been found that the apparatus will operate satisfactorily when the said bracket is connected to the shoe at points more rearwardly.

Pivotal movement of the shoe and the parts mounted thereon about the bolt 42 is limited by stop means comprising counterparts of which one constitutes a pin 43 extending between the spaced pilot bars 12 and of which counterparts the other constitutes an angle bracket 44 connected to the vertical member 31 of the roller supporting bracket 29 by a bolt 45.

Counter-clockwise pivotal movement of the shoe 25 about the bolt 42 is limited by abutment of the head of the bolt 45 with the pin 43, whereas clockwise pivotal movement of said shoe is limited by abutment of the perch or horizontal leg 46 of the angle bracket 44 with the pin 43. An elongated opening 47 in the vertical bracket leg 31 is provided for receiving the shank of the bolt 45 so that this bolt together with the angle bracket 44 may be adjusted vertically for selectively determining the oscillating or pivotal limits of the skid shoe and particularly of the point member 37 carried upon its front end.

When the apparatus is in operation, it will be pushed or propelled across the field between the planted rows of the crop, and the shoe 25 will slide along the surface of the field while the point 38 upon the member 37 cuts a shallow furrow to insure that said member 37 will pass beneath all of the plant growth or vines that are disposed within its path. The vines are thus penetrated by the point member 37, the roller guard 36, and the roller 35 as said vines are elevated upwardly onto these parts and onto the vine-turning rods 39. Thus, the vines of the adjacent rows on opposite sides of the apparatus are separated and left by the apparatus to lay adjacent to their respective root rows.

Sometimes in the operation of the apparatus, banks of earth, such as those resulting from cross-furrows, irrigation ditches and the like, will be encountered and when such is the case the shoe 25 is adapted, because of the pivotal connection with the bolt 42, to slide over these banks instead of burrowing thereinto. By way of example, a bank B is illustrated in Figure 2, and here it will be seen that the upturned leading portion of the shoe encountering said bank has caused the shoe to glide upwardly onto the bank incident to the pivoting of the shoe about the bolt 42. It will be conceived that if the shoe 25 were not pivotally connected with the pilot bars 12, the point member 37 in some instances would penetrate the bank instead of gliding over its surface, and that if such bank should be of great width the apparatus would bury itself so deeply into the bank to thwart its intended operation and possibly incur injury or breakage.

Should the shoe 25 fail to glide upwardly onto a narrow bank as B, wherefore the point member 37 would be turned downwardly into the bank incident to pivoting the shoe clockwise about the bolt 42, the amount of this clockwise pivoting would be limited by the horizontal portion 46 of the bracket 44 striking the stop pin 43 so that after traversal of said bank the shoe 25 would rearrange itself to the normal position shown in Figure 1.

While I have herein shown and described a preferred embodiment, it should be understood that the invention extends to other forms, structures, modifications, and combinations of parts falling within the spirit thereof and not sacrificing all of its advantages.

What is claimed is:

1. In a crop treating apparatus, in combination, a vehicular support, forwardly extending pilot means pivoted at one end on said support for free vertical floating movement, a forwardly extending vine divider unit including a ground-engaging shoe, a bracket upon said shoe, an upwardly and rearwardly extending divider cylinder mounted for rotation in said bracket, and means pivotally mounting said shoe intermediate its ends upon the free end of said pilot means for rocking movement with respect thereto.

2. In a crop treating apparatus, in combination, a vehicular support, lift means on said support, forwardly extending pilot means pivoted at one end on said support for free vertical floating movement, a forwardly extending vine divider unit including a ground-engaging shoe, a bracket upon said shoe, an upwardly and rearwardly extending divider cylinder mounted for rotation in said bracket, means pivotally mounting said shoe intermediate its ends upon the free end of said pilot means for rocking movement with respect thereto, and means connecting said lift means with said pilot means for raising and lowering said divider unit with respect to the ground.

3. In a crop treating implement, in combination, a tractor, lift means on the tractor, a vine divider attached to said tractor comprising a forwardly extending pilot member pivoted rearwardly upon said tractor for free vertical floating movement, a longitudinally extending ground-engaging shoe, means pivotally mounting said shoe intermediate its ends upon the free end of said pilot member for vertical rocking movement with respect thereto to permit said shoe to follow the contour of the ground, a pointed member affixed to the forward end of said shoe and arranged to project below the earth-engaging surface of said shoe, a bracket on said shoe, a cylinder rotatably mounted in said bracket, means limiting rocking movement of said shoe about its point of pivot on said pilot member, and means connecting said lift means with said pilot member for raising and lowering said vine divider about its pivot on said tractor.

CHARLES H. ZIRCKEL.